UNITED STATES PATENT OFFICE.

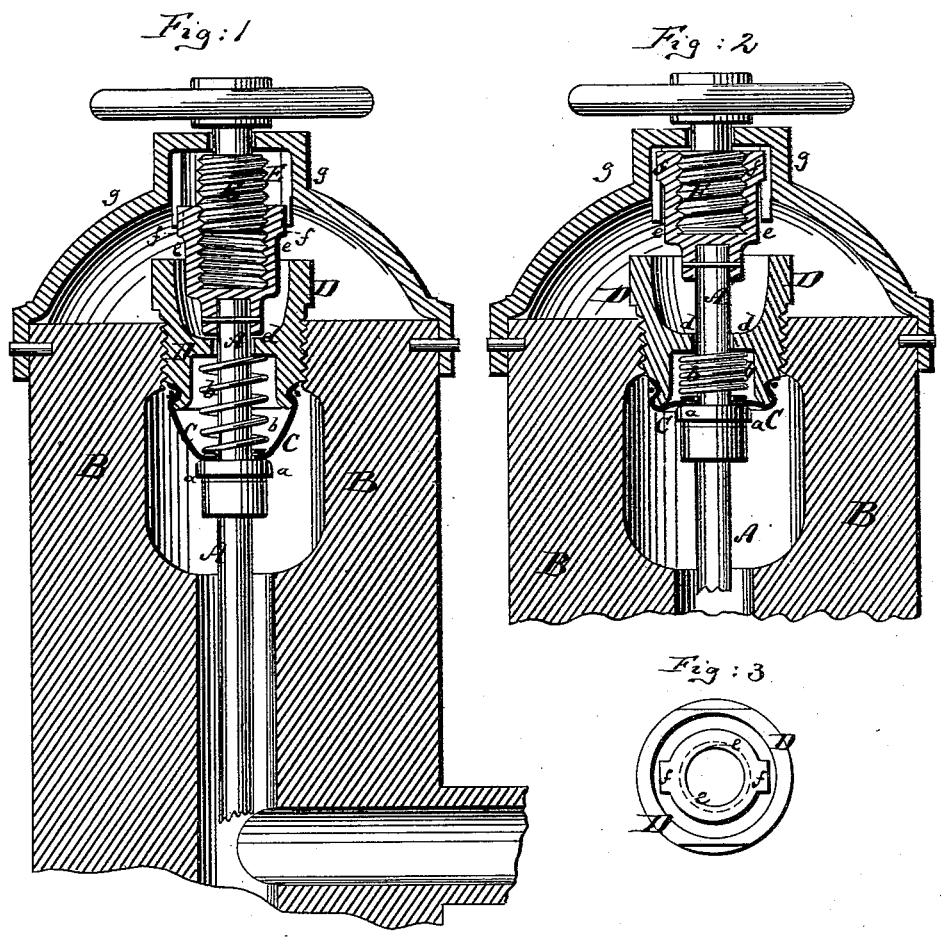

JAMES P. HYDE, OF NEW YORK, N. Y., ASSIGNOR TO FREDERICK A. BALDWIN, OF SAME PLACE.

IMPROVEMENT IN STUFFING-BOX AND VALVE MECHANISMS FOR HYDRANTS, &c.

Specification forming part of Letters Patent No. 166,611, dated August 10, 1875; application filed May 10, 1875.

*To all whom it may concern:*

Be it known that I, JAMES P. HYDE, of New York city, in the county and State of New York, have invented a new and Improved Stuffing-Box and Valve Mechanism for Hydrants, &c., of which the following is a specification:

Figures 1 and 2 are vertical central sections of the upper part of a hydrant containing my improvements, and showing the parts in different positions. Fig. 3 is a detail top view of the nut on the upper end of the valve-rod, and of the gland through which the valve-rod passes.

Similar letters of reference indicate corresponding parts in all the figures.

This invention relates to the combination of a spring with a flexible diaphragm or follower stuffing-box, which connects with a reciprocating rod, for the purpose of tightening the diaphragm on the rod and producing a firmer gripe the more necessity there is for a close connection—that is to say, when in a hydrant, for example, the valve is raised so that water passes up to the discharge-spout, it is necessary that the valve-rod be properly packed above the spout, while the necessity for a good packing virtually ceases when the valve is closed. Now the spring is compressed by the elevation of the valve-rod, and crowds thereby the inner part of the diaphragm stuffing-box tight upon a shoulder that projects from the rod.

In the drawing, the letter A represents the rod of a hydrant or other machinery, to which rod reciprocating motion is to be imparted, and which is packed to prevent the escape of fluid from the chamber B, wherein it moves and wherefrom it extends. C is the stuffing-box used by me as such packing. It is an annular piece of leather, india-rubber, or other fabric flexible and impervious to the fluids to be excluded or confined. Its outer circumference is firmly and stationarily attached by suitable means to the gland D, through which the rod extends, or to any other suitable stationary part of the chamber in which the rod travels. The inner circumference of the annular leather or stuffing box C embraces the rod A closely, and is confined between a shoulder, a, on said rod and a spring, b, as shown in the drawing. The spring b constitutes an automatic griper, for producing a firm gripe when the same is most needed. Thus when, as in Fig. 1, the rod A is lowered and the valve of the hydrant on its seat, the spring b is extended, and the flexible packing C comparatively loose on the rod, for in this position of the parts, no water passing through the hydrant, a tight packing is not necessary; but as the rod A is raised to admit water into the hydrant, the spring b is compressed or contracted against a stationary inner shoulder, d, of the gland D, as clearly shown in Fig. 2, and serves thereby to firmly press the inner part of the packing-plate C against the shoulder a, and to produce quite a tight joint—the more so the more the rod A is raised, and the more there is a necessity for a tight joint. A washer is preferably interposed between the spring b and the packing-plate C, as indicated in Figs. 1 and 2. e is a nut directly and rigidly fastened upon the upper end of the hydrant, valve-rod A being thus the upper termination of said rod. This nut has feathers ff, entering grooves in the removable cap g of the hydrant, so that it cannot revolve when the cap is applied, but is free to revolve when the cap is detached, and receives in its threaded part a screw, E, which is swiveled in the cap g, as shown. By revolving the screw E the nut e will be moved up or down, and with it the valve-rod A and the valve thereon, all in the manner required.

I claim as my invention—

In combination with the reciprocating rod A, having the shoulder a, and with the annular flexible diaphragm C, which rests on said shoulder, the spring b, which keeps the diaphragm in contact with the shoulder a, substantially as herein shown and described.

JAMES P. HYDE.

Witnesses:
E. C. WEBB,
A. V. BRIESEN.